United States Patent
Nishimura et al.

(10) Patent No.: US 7,298,115 B2
(45) Date of Patent: Nov. 20, 2007

(54) CONTROL APPARATUS FOR A VEHICULAR ALTERNATOR

(75) Inventors: Shinji Nishimura, Tokyo (JP); Wakaki Miyaji, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 79 days.

(21) Appl. No.: 11/367,315

(22) Filed: Mar. 6, 2006

(65) Prior Publication Data

US 2007/0069697 A1   Mar. 29, 2007

(30) Foreign Application Priority Data

Sep. 26, 2005   (JP) .............................. 2005-277856

(51) Int. Cl.
*H02P 9/14* (2006.01)
(52) U.S. Cl. ......................................... 322/28; 322/36
(58) Field of Classification Search ................. 322/23, 322/25, 27, 28, 36, 37, 59, 99
See application file for complete search history.

(56) References Cited

U.S. PATENT DOCUMENTS 4,262,243 A * 4/1981 Mori et al. .................... 322/99
5,719,484 A * 2/1998 Taniguchi et al. ............ 322/20
5,719,486 A * 2/1998 Taniguchi et al. ............ 322/28
5,726,557 A * 3/1998 Umeda et al. ................ 322/21
6,664,767 B2 * 12/2003 Takahashi et al. ........... 322/28
6,803,747 B2 * 10/2004 Taniguchi et al. ............ 322/28

FOREIGN PATENT DOCUMENTS

JP   2003-174799 A   6/2003

* cited by examiner

*Primary Examiner*—Nicholas Ponomarenko
(74) *Attorney, Agent, or Firm*—Sughrue Mion, PLLC

(57) ABSTRACT

A control apparatus for a vehicular alternator can improve its reliability and reduce its cost by attenuating a field current of a rotor coil with a simple circuit. The apparatus includes an armature coil, a rectifier circuit, a rotor coil and a voltage control circuit. The rectifier circuit has an AC input terminal, a positive and a negative output terminal. The voltage control circuit controls a generation voltage to be substantially constant by interrupting a field current when a generation voltage exceeds a first predetermined voltage, while passing the field current when the generation voltage is equal to or lower than the first predetermined voltage. A circulation circuit comprising a diode and a current attenuation element serves to circulate the field current upon interruption thereof. A short-circuiting circuit short-circuits the current attenuation element. A short-circuit control circuit opens the short-circuiting circuit when the generation voltage exceeds a second predetermined voltage.

2 Claims, 1 Drawing Sheet

CONTROL APPARATUS FOR A VEHICULAR ALTERNATOR

BACKGROUND OF THE INVENTION

1. Field of the Invention

The present invention relates to a control apparatus for a vehicular alternator, and more particularly, to a new technique for achieving improved reliability and cost reduction.

2. Description of the Related Art

A known control apparatus for a vehicular alternator operates to switch the alternator so as to be connected to a circuit that consumes energy due to a field current, by the use of a resistor, a diode, etc., in order to quickly reduce the field current (see, for example, a first patent document (Japanese patent application laid-open No. 2003-174799)).

In such a known control apparatus for a vehicular alternator, a first attenuating circuit and a second non-attenuating circuit are switched over from one to the other by the use of two switches, thus resulting in a problem that the structure of the control apparatus becomes complicated and expensive.

In addition, since the first and second circuits have diodes, respectively, there is another problem that the number of component parts is increased, thereby making the control apparatus further expensive.

Moreover, if the two switches are turned off at the same time, there will be a possibility that the control apparatus might be destroyed by an overvoltage, so there is a further problem that an additional circuit is required so as to avoid this, thus making the structure of the control apparatus further complicated.

SUMMARY OF THE INVENTION

Accordingly, the present invention is intended to solve the various problems as referred to above, and has for its object to obtain a control apparatus for a vehicular alternator which is capable of achieving improvement in reliability and reduction in cost by making it possible to attenuate a field current of a rotor coil with the use of a simple circuit.

Bearing the above object in mind, according to the present invention, there is provided a control apparatus for a vehicular alternator in which the vehicular alternator includes an armature coil wound around a stator core, a rectifier circuit connected to the armature coil, a rotor arranged in a manner to be rotatable relative to the armature coil, a rotor coil for exciting a magnetic pole of the rotor to an N polarity and an S polarity, and a voltage control circuit that controls a power generation voltage output from the rectifier circuit so as to be substantially constant. The rectifier circuit has an AC input terminal for taking in an alternating voltage generated in the armature coil for rectification thereof into a direct current, a positive output terminal for outputting a direct current positive voltage, and a negative output terminal for outputting a direct current negative voltage. The voltage control circuit controls the power generation voltage so as to be substantially constant by interrupting a field current of the rotor coil when the power generation voltage exceeds a first predetermined voltage, while passing the field current when the power generation voltage is equal to or lower than the first predetermined voltage. The voltage control circuit includes a circulation circuit composed of a series circuit comprising a diode and a current attenuation element that circulates the field current upon interruption thereof, a short-circuiting circuit that short-circuits the current attenuation element, and a short-circuit control circuit that opens the short-circuiting circuit when the power generation voltage exceeds a second predetermined voltage.

According to the present invention, it is possible to attenuate the field current of the rotor coil with a simple circuit, whereby the reliability of the control apparatus can be improved, and the cost of manufacture thereof can be reduced.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENT

Figure 1:
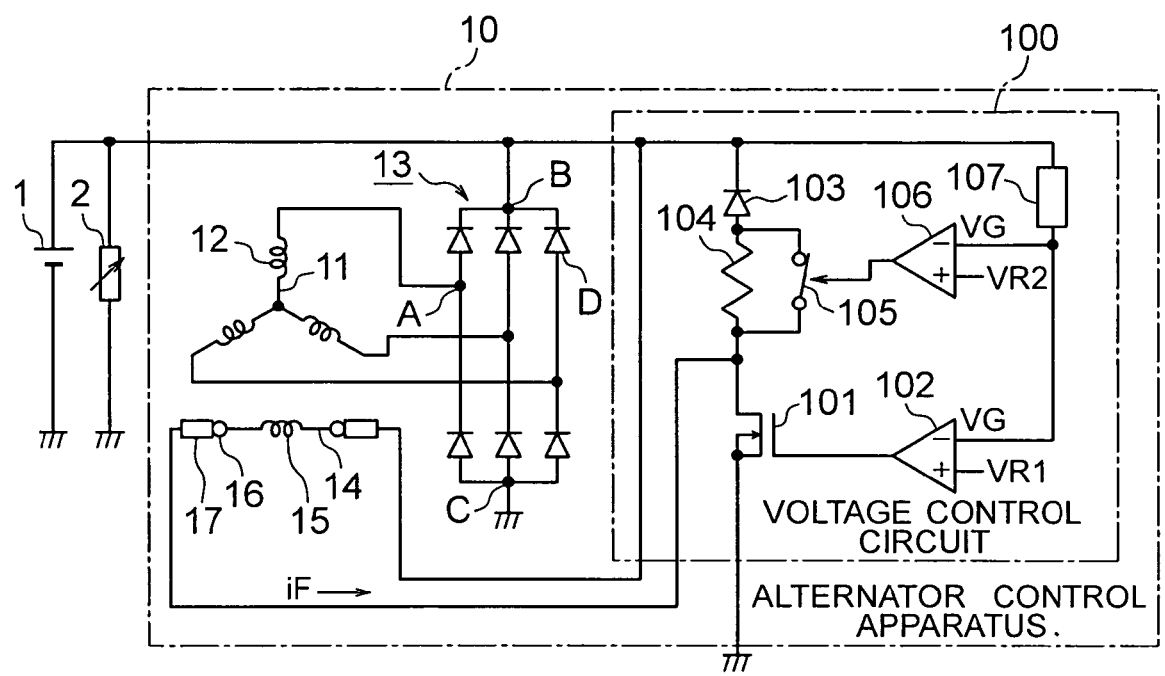
FIG. 1 is a circuit diagram conceptually showing a control apparatus for a vehicular alternator according to a first embodiment of the present invention.

Now, a preferred embodiment of the present invention will be described in detail while referring to the accompanying drawings.

Embodiment 1

FIG. 1 is a circuit diagram that conceptually shows a control apparatus for a vehicular alternator according to a first embodiment of the present invention.

In FIG. 1, the control apparatus for a vehicular alternator (hereinafter also referred to as an alternator control apparatus), generally designated at reference numeral 10, is connected to an on-board or vehicle-mounted battery 1. An electric load 2 comprising a variety of kinds of on-board devices is connected to the battery 1. The alternator control apparatus 10 serves to control a voltage (hereinafter referred to as a power generation voltage) generated by the alternator in accordance with the electric load 2 that varies by turning on/off of each on-board device.

The alternator control apparatus 10 includes an three-phase armature coil 12 wound around a stator core 11, a rectifier circuit 13 connected to the armature coil 12, a rotor 14 arranged in a manner to be rotatable relative to the armature coil 12, a rotor coil 15 connected at its one end to the rotor 14 for exciting a magnetic pole of the rotor 14 to an N polarity and an S polarity, and a voltage control circuit 100 for controlling a power generation voltage VG output from the rectifier circuit 13 in a manner to be substantially constant.

The rectifier circuit 13 has an AC input terminal A for taking in an alternating voltage generated in the armature coil 12 for rectification into a direct current, a positive output terminal B for outputting a direct current positive voltage, a negative output terminal C for outputting a direct current negative voltage, and a plurality (e.g., three pairs) of diodes D inserted between the positive output terminal B and the negative output terminal C.

The rotor 14 and the rotor coil 15 are rotatably supported through a pair of slip rings 16 and a pair of brushes 17.

The voltage control circuit 100 includes a power transistor 101 in the form of a MOSFET for turning on and off a field current iF of the rotor coil 15, and a first comparator 102 for turning on and off the power transistor 101.

In the first comparator 102, the power generation voltage VG (the output voltage of the rectifier circuit 13) is input to an inverting input terminal (−) through an input resistor 107, and a first predetermined voltage VR1, which becomes a comparison reference, is input to a non-inverting input terminal (+). The first comparator 102 controls the power generation voltage VG so as to be substantially constant by interrupting the field current iF when the power generation voltage VG exceeds the first predetermined voltage VR1, while passing or supplying the field current iF when the power generation voltage VG is equal to or lower than the first predetermined voltage VR1.

The voltage control circuit 100 includes a return or circulation circuit in the form of a series circuit comprising a diode 103 and a resistor (current attenuation element) 104, a normally closed switch (short-circuiting circuit) 105 for short-circuiting the resistor 104, and a second comparator (short-circuit control circuit) 106 for controlling the opening (turn-off) of the switch 105. The circulation circuit comprising the diode 103 and the resistor 104 serves to circulate or return the field current iF when the field current iF is interrupted.

In the second comparator 106, the power generation voltage VG is input to a non-inverting input terminal (−) through the input resistor 107, and a second predetermined voltage VR2, which becomes a comparison reference, is input to a non-inverting input terminal (+). When the power generation voltage VG exceeds the second predetermined voltage VR2, the second comparator 106 opens or turns off the switch 105. Here, note that the second predetermined voltage VR2 is set higher than the first predetermined voltage VR1.

Next, reference will be made to a specific control operation according to the first embodiment of this present invention as shown in FIG. 1.

The resistor 104 of the circulation circuit is normally short-circuited by the normally closed switch 105, as illustrated. When the power generation voltage VG is equal to or lower than the first predetermined voltage VR1, the first comparator 102 in the voltage control circuit 100 turns on the power transistor 101 whereby the field current iF is caused to flow through the rotor coil 15, whereas when the power generation voltage VG exceeds the first predetermined voltage VR1, the first comparator 102 turns off the power transistor 101 thereby to reduce the field current iF. That is, when the power transistor 101 is turned off, the resistor 104 of the circulation circuit is short-circuited whereby a return or circulation current flows through the switch 105 and the diode 103, thus gradually attenuating the field current iF.

Thereafter, when the power generation voltage VG decreases to the first predetermined voltage VR1 or less, the first comparator 102 turns on the power transistor 101 again whereby the field current iF is increased to raise the power generation voltage VG.

Here, note that the circulation current that flows in normal time never passes through the short-circuited resistor 104, so current loss can be suppressed. The above-mentioned normal operation of the control apparatus 100 is similar to that of the aforementioned known alternator.

On the other hand, when the power generation voltage VG is rapidly increased to exceed the second predetermined voltage VR2 (>VR1), for example, due to interruption of the electric load 2, not only the power transistor 101 is turned off by the first comparator 102 but also the switch 105, short-circuiting the resistor 104, is simultaneously turned off by an output signal of the second comparator 106. As a result, the circulation current flows through the resistor 104 and the diode 103, so it is attenuated more quickly than at the time of normal operation.

Thus, only by controlling to turn on/off the single switch 105, it is possible to switch, at the time of turning off the electric load 2, the alternator into an operation of quickly attenuating the field current iF while maintaining a high efficiency operation thereof, as in the known alternator. Accordingly, it is possible to attenuate the field current iF of the rotor coil 15 with the use of a simple circuit, whereby the reliability of the control apparatus 10 can be improved, and at the same time, the cost of manufacture thereof can be reduced.

In addition, the second predetermined voltage VR2 of the second comparator 106 (the short-circuit control circuit), becoming a determination reference, is set higher than the first predetermined voltage VR1, so it is ensured that the switch 105 (the short-circuiting circuit) is held turned on (short-circuited) when the alternator is in normal use. As a consequence, the heat generation and loss of the resistor 104 (the attenuation element) can be avoided, thus making it possible to maintain high efficiency of the alternator.

Although the switch 105, being mechanically opened and closed, is used as the short-circuiting circuit of the resistor 104, a semiconductor switch may instead be employed.

Moreover, although the resistor 104 is used as the attenuation element in the circulation circuit, a Zener diode may instead be employed.

While the invention has been described in terms of a preferred embodiment, those skilled in the art will recognize that the invention can be practiced with modifications within the spirit and scope of the appended claims.

What is claimed is:

1. A control apparatus for a vehicular alternator in which said vehicular alternator includes:

an armature coil wound around a stator core;

a rectifier circuit connected to said armature coil;

a rotor arranged in a manner to be rotatable relative to said armature coil;

a rotor coil for exciting a magnetic pole of said rotor to an N polarity and an S polarity; and a voltage control circuit that controls a power generation voltage output from said rectifier circuit so as to be substantially constant;

wherein said rectifier circuit has an AC input terminal for taking in an alternating voltage generated in said armature coil for rectification thereof into a direct current, a positive output terminal for outputting a direct current positive voltage, and a negative output terminal for outputting a direct current negative voltage;

said voltage control circuit controls said power generation voltage so as to be substantially constant by interrupting a field current of said rotor coil when said power generation voltage exceeds a first predetermined voltage, while passing said field current when said power generation voltage is equal to or lower than said first predetermined voltage;

said voltage control circuit comprises:

a circulation circuit composed of a series circuit comprising a diode and a current attenuation element that circulates said field current upon interruption thereof;

a short-circuiting circuit that short-circuits said current attenuation element; and a short-circuit control circuit that opens said short-circuiting circuit when said power generation voltage exceeds a second predetermined voltage.

2. The control apparatus for a vehicular alternator as set forth in claim 1, wherein said second predetermined voltage is set higher than said first predetermined voltage.

* * * * *